United States Patent
Ohashi

(10) Patent No.: US 7,810,632 B2
(45) Date of Patent: Oct. 12, 2010

(54) VIBRATORY CONVEYING APPARATUS

(75) Inventor: Masao Ohashi, Iwata (JP)

(73) Assignee: Nac Feeding Co., Ltd., Shizuoka (JP)

( * ) Notice: Subject to any disclaimer, the term of this patent is extended or adjusted under 35 U.S.C. 154(b) by 0 days.

(21) Appl. No.: 12/175,215

(22) Filed: Jul. 17, 2008

(65) Prior Publication Data
US 2009/0008222 A1 Jan. 8, 2009

Related U.S. Application Data

(63) Continuation of application No. PCT/JP2006/325776, filed on Dec. 25, 2006.

(30) Foreign Application Priority Data

Jan. 17, 2006 (JP) ............................. 2006-008144
Dec. 15, 2006 (JP) ............................. 2006-338338

(51) Int. Cl.
*B65G 27/34* (2006.01)
*B65G 27/16* (2006.01)

(52) U.S. Cl. ...................... 198/720; 198/759; 198/771; 198/766

(58) Field of Classification Search ................. 198/771, 198/720, 752.1, 750.1, 766, 776, 533, 409
See application file for complete search history.

(56) References Cited

U.S. PATENT DOCUMENTS 3,187,473 A * 6/1965 Ruppe .......................... 451/32
3,246,429 A * 4/1966 Ruppe .......................... 451/113
6,315,159 B1 * 11/2001 Paczkowski ............. 221/312 R

FOREIGN PATENT DOCUMENTS

| JP | 59-097912 | 6/1984 |
| JP | 62-173314 | 11/1987 |
| JP | 01-109010 | 7/1989 |
| JP | 03-166116 | 7/1991 |
| JP | 04-039206 | 2/1992 |
| JP | 04-023853 | 6/1992 |
| JP | 05-024620 | 3/1993 |
| JP | 06-345238 | 12/1994 |
| JP | 2001-171826 | 6/2001 |
| JP | 2003-128227 | 5/2003 |
| JP | 2005-035790 | 2/2005 |
| WO | WO 2004/067413 | 8/2004 |

* cited by examiner

*Primary Examiner*—Gene Crawford
*Assistant Examiner*—Kavel P Singh
(74) *Attorney, Agent, or Firm*—Knobbe, Martens, Olson & Bear, LLP

(57) ABSTRACT

A vibratory conveying apparatus has a simple structure and can align and sort parts to a desired posture. The vibratory conveying apparatus comprising a conveying chute having a first conveying surface that is connected to a driving source by a leaf spring that is reciprocatingly vibrated by the driving source. The vibratory conveying apparatus also comprises a linear return chute having a second conveying surface to return sorted parts dropped from the conveying chute during alignment or another sorting process performed on the conveying chute. A deflectable motion transmitter transmits vibration from the first conveying surface of the conveying chute to the second conveying surface of the return chute.

11 Claims, 19 Drawing Sheets

[Fig 1]
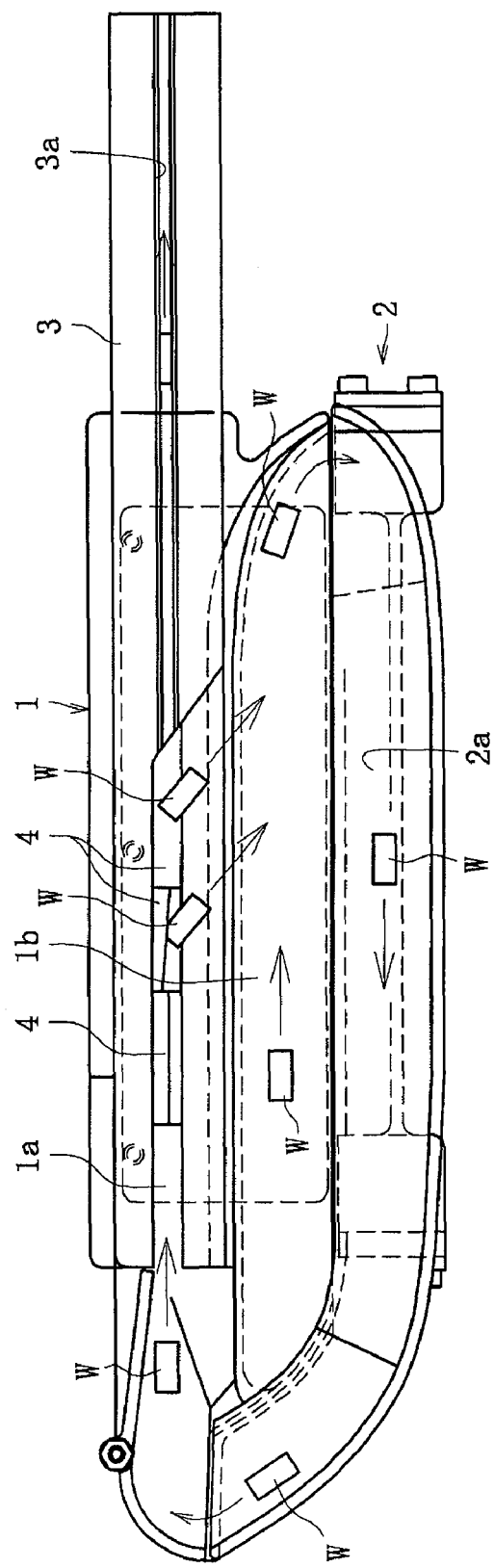

[Fig 2]
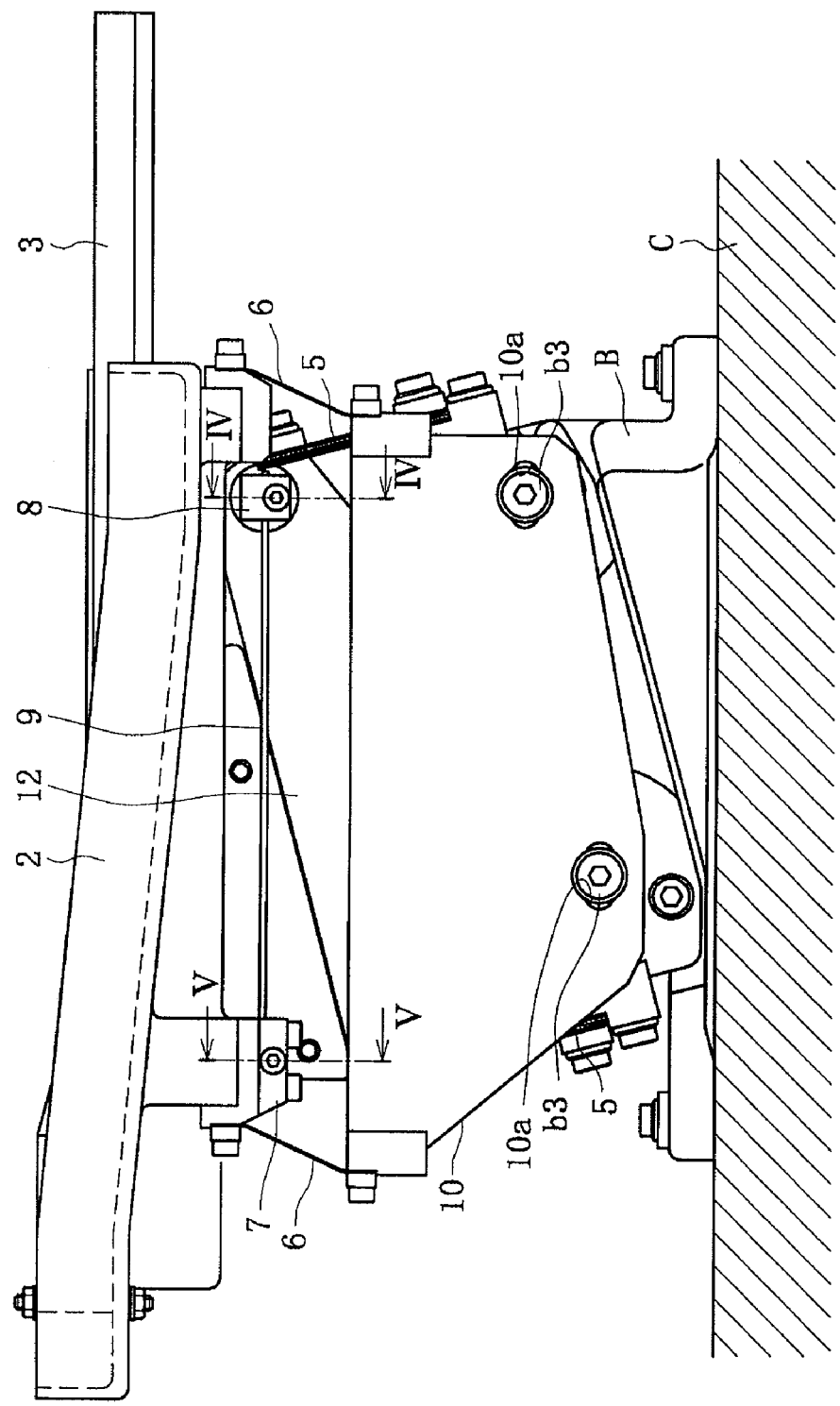

[Fig 3]
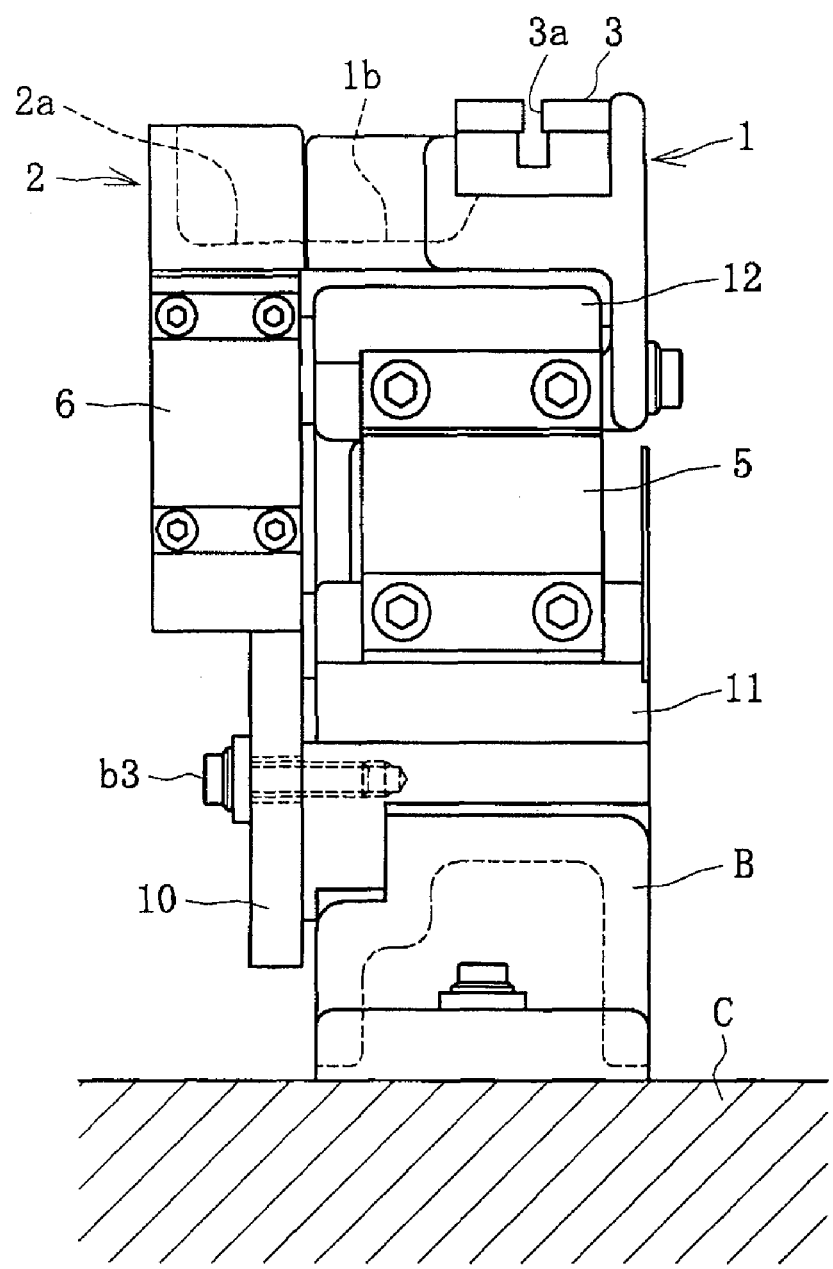

[ Fig 4 ]
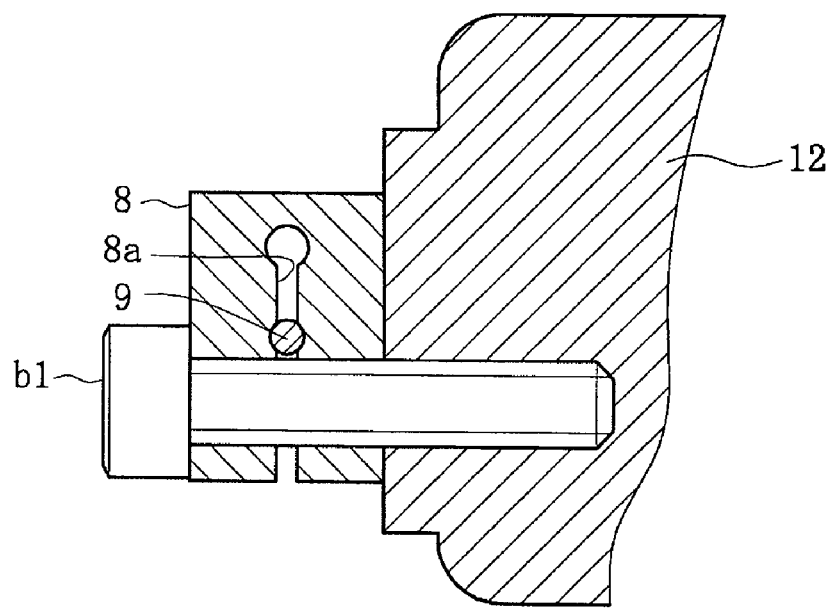
[ Fig 5 ]
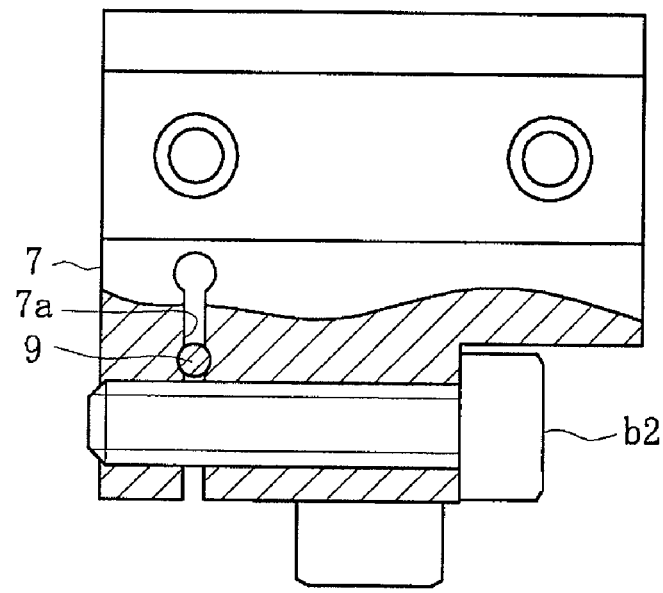

[Fig 6]
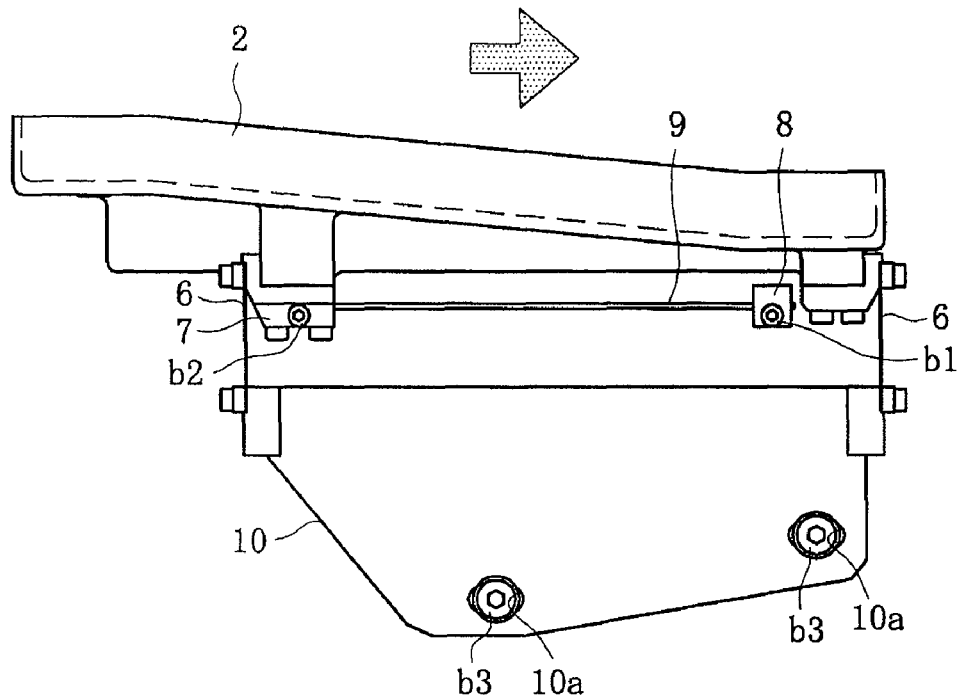
[Fig 7]
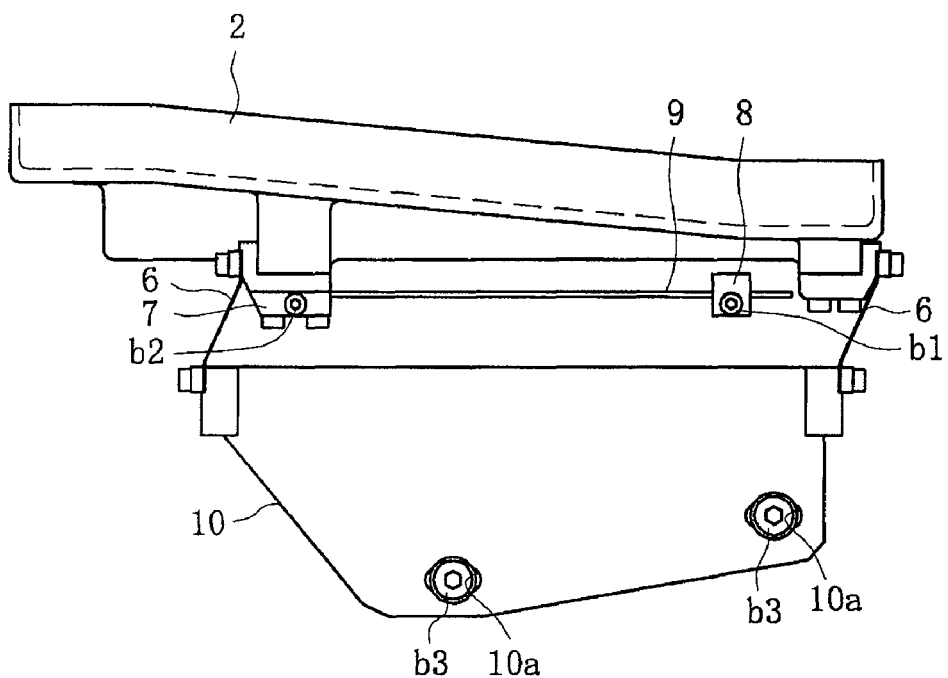

[ Fig 8 ]
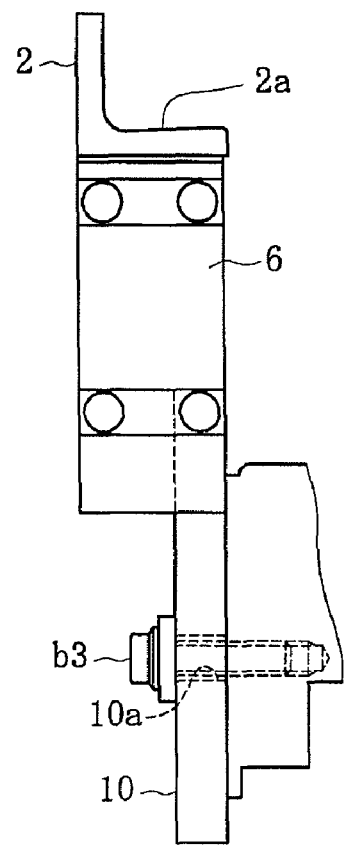
[ Fig 9 ]
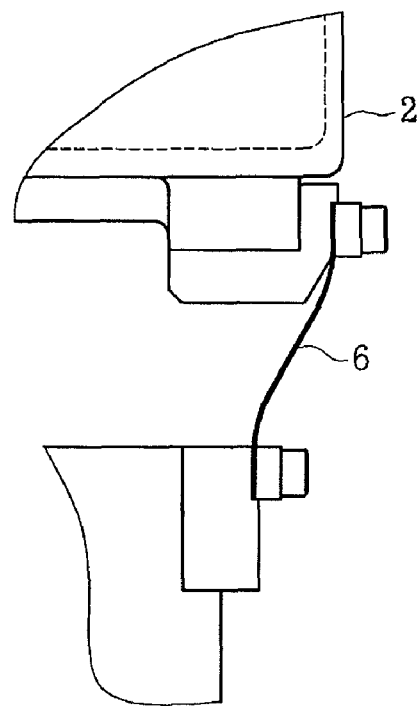

[Fig 10]
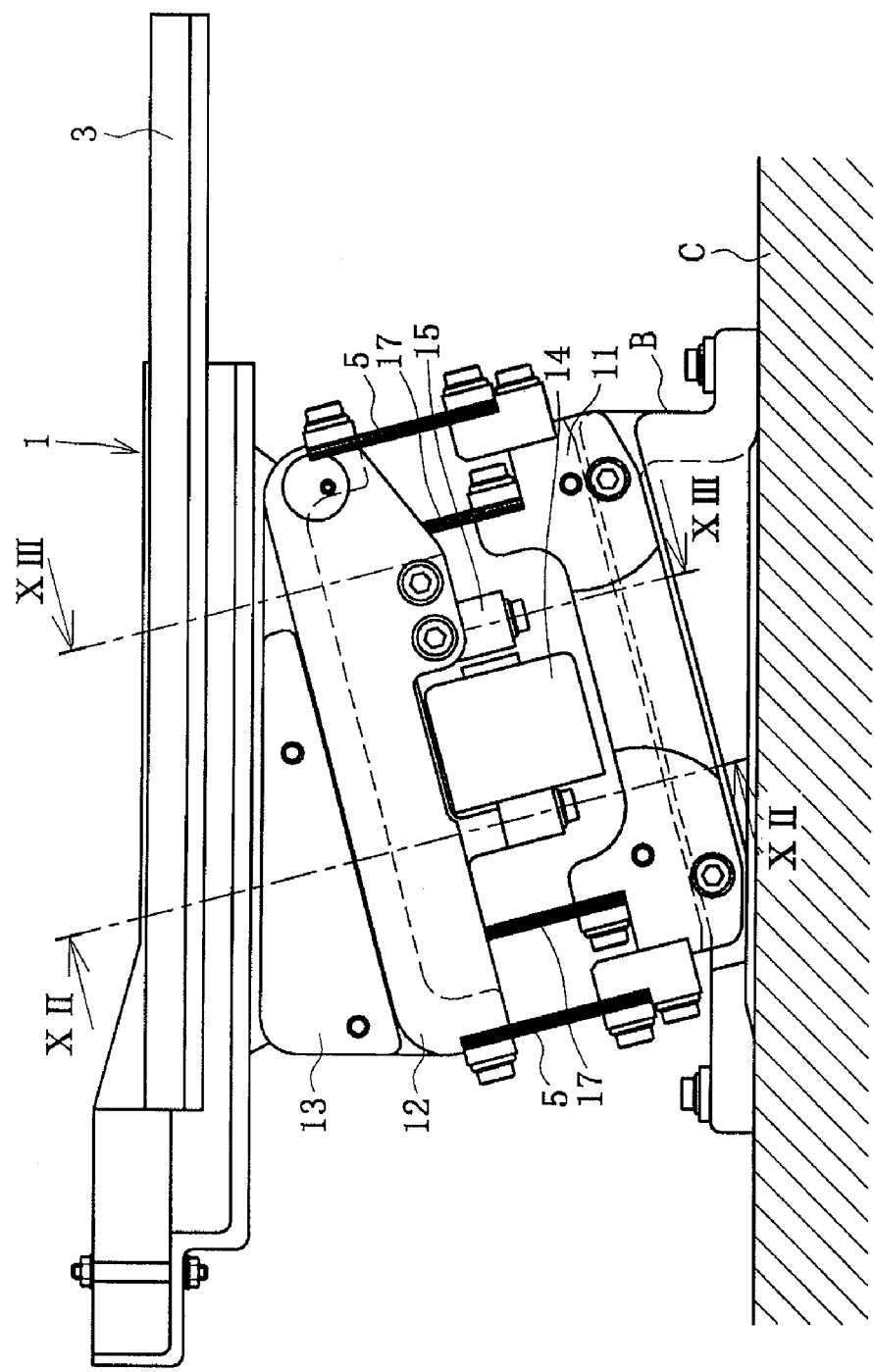

[Fig 11]
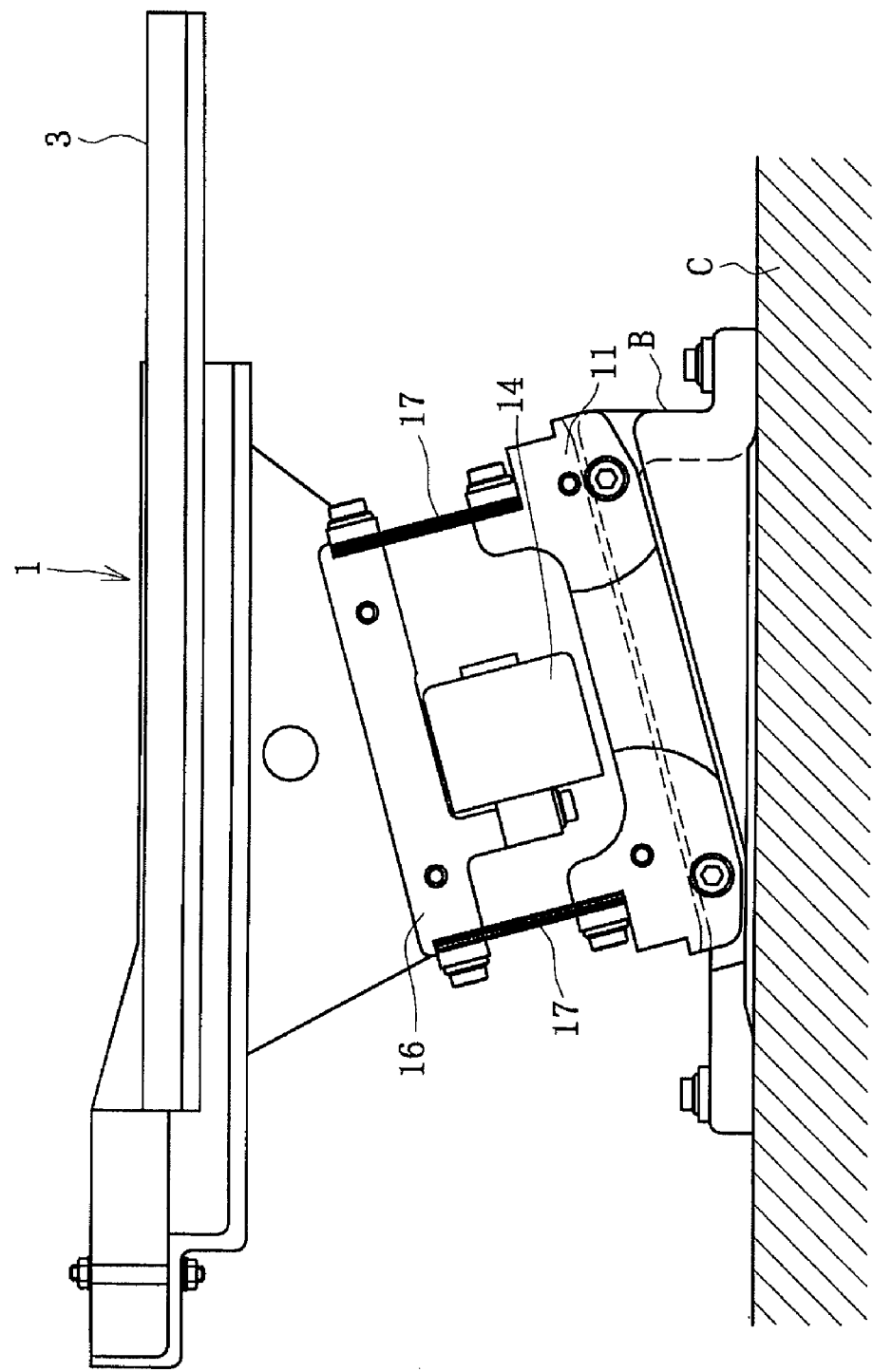

[ Fig 12 ]
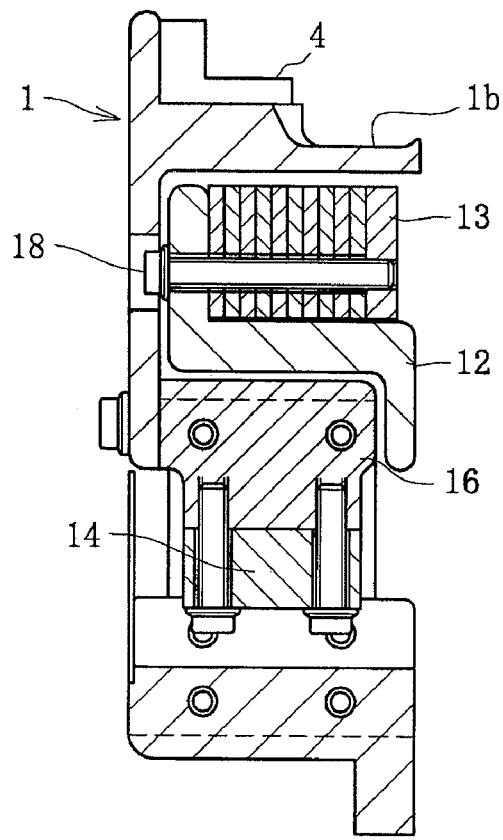
[ Fig 13 ]
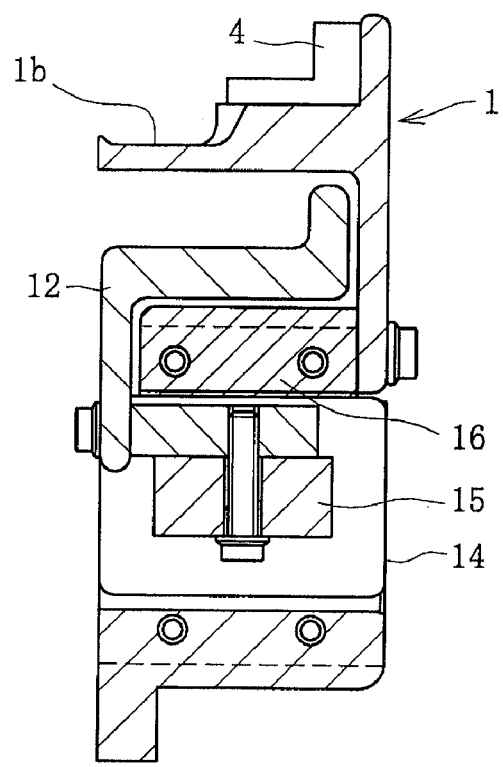

[Fig 14]
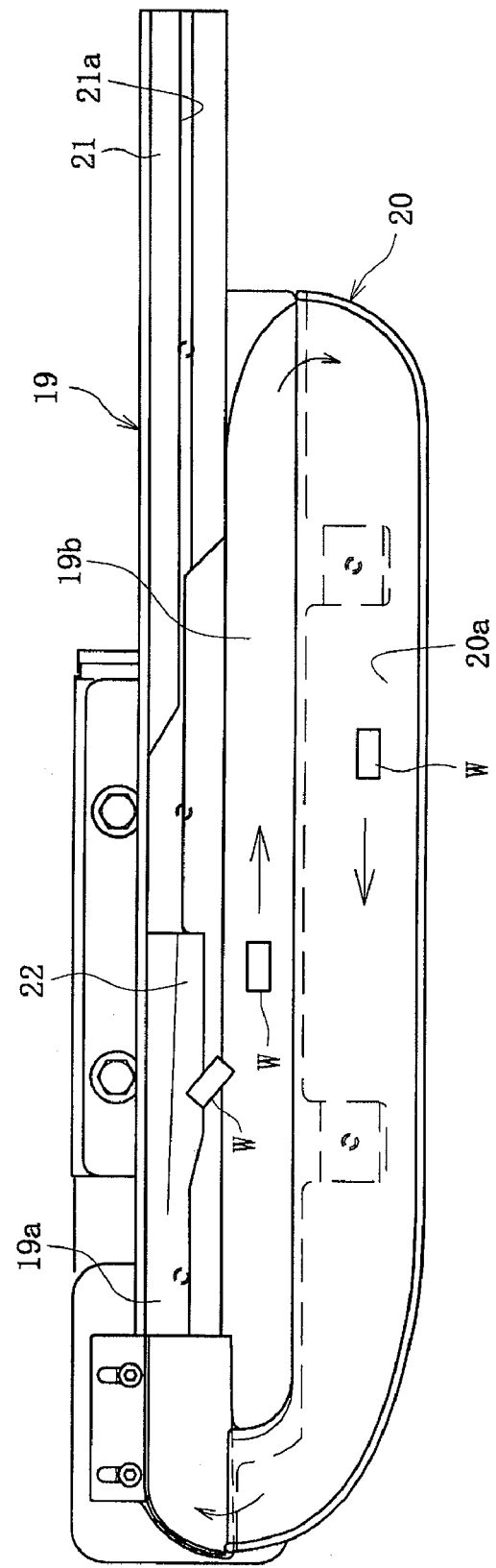

[Fig 15]
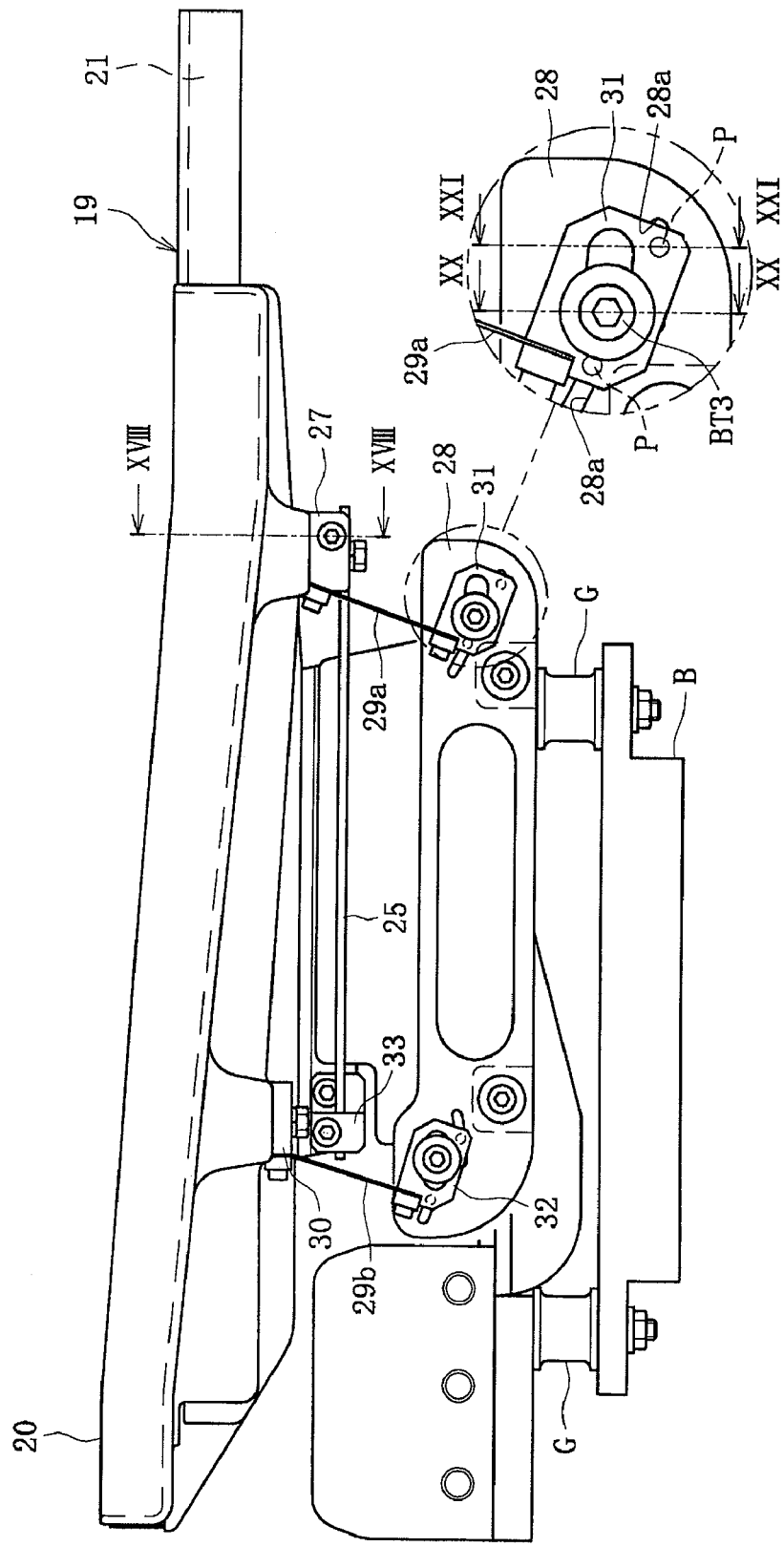

[Fig 16]
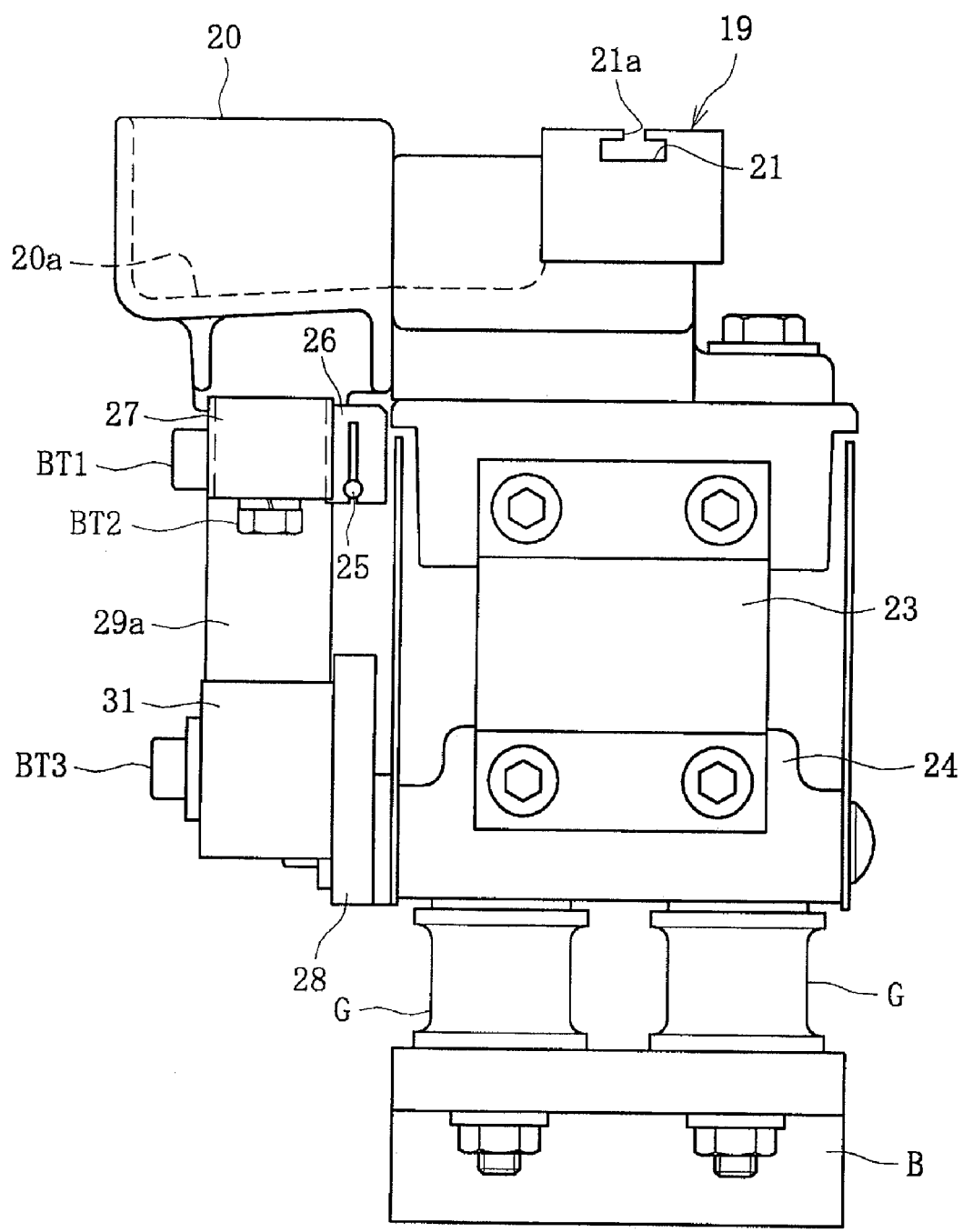

[Fig 17]
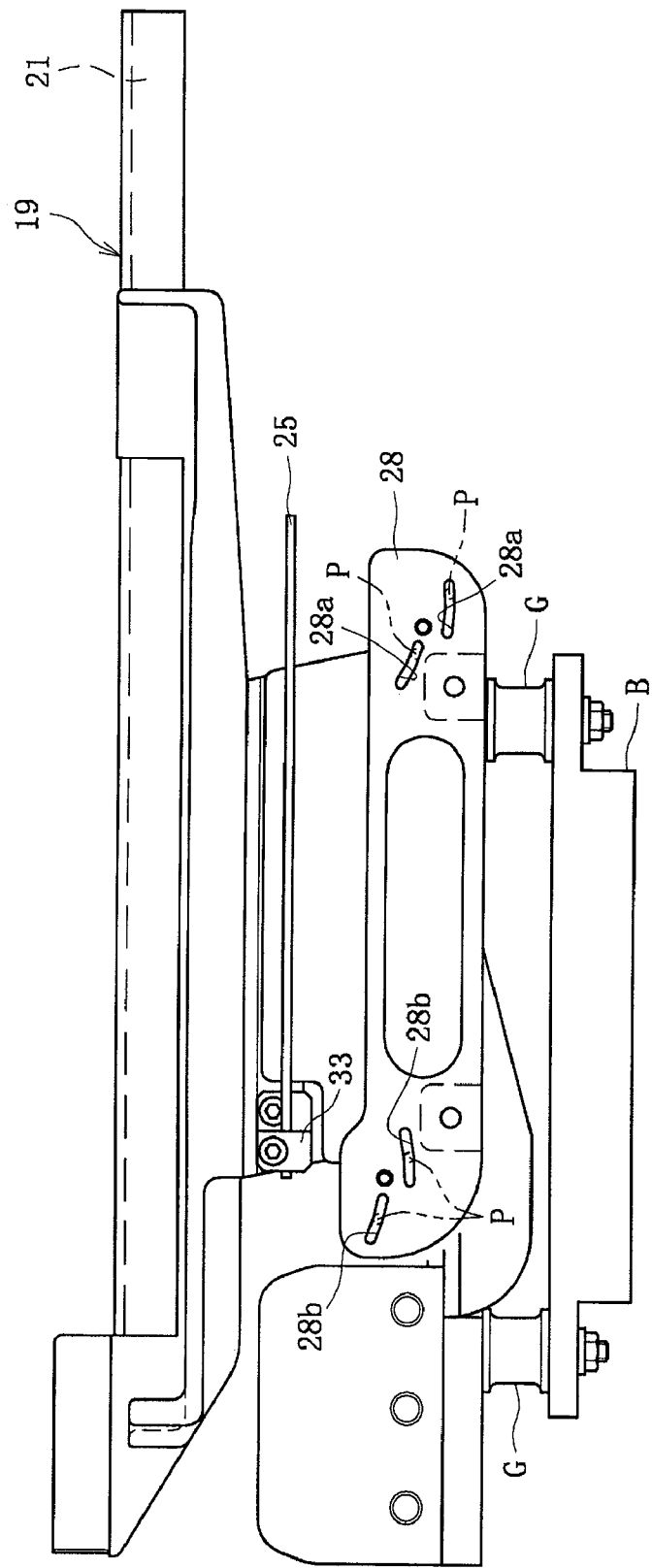

[ Fig 18 ]
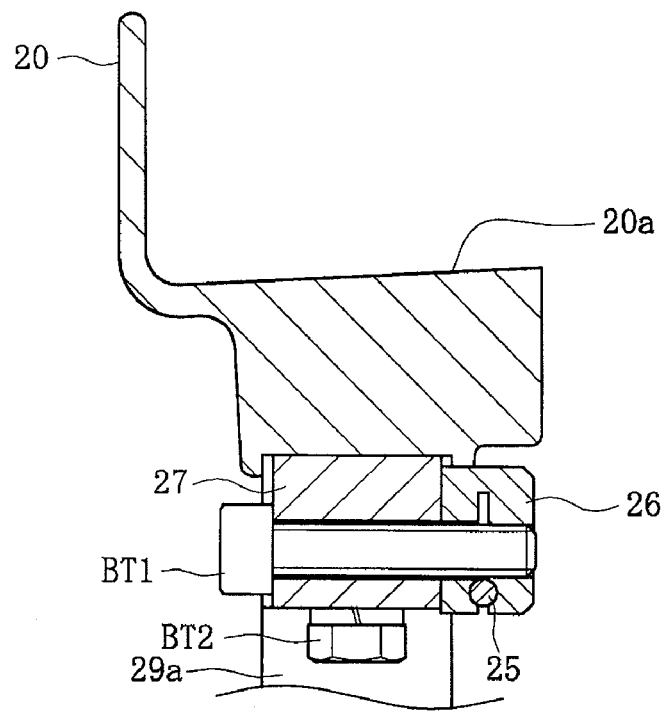
[ Fig 19 ]
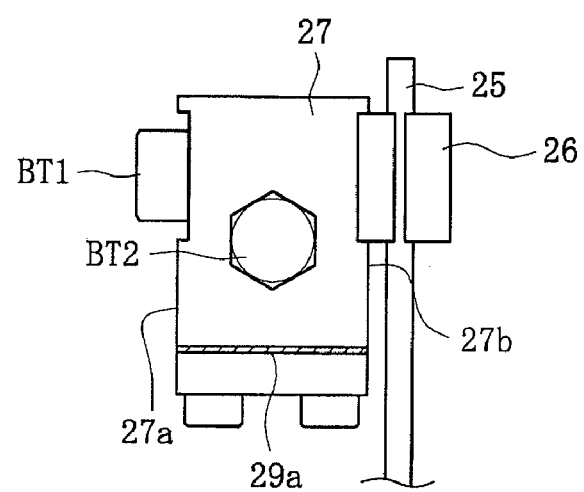

[ Fig 20 ]
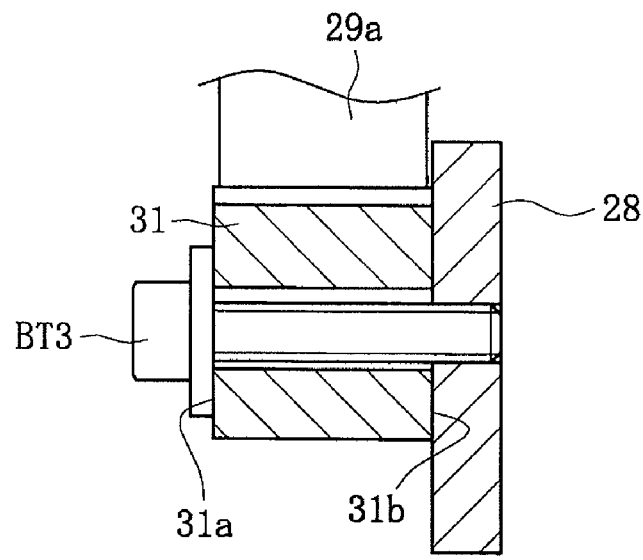
[ Fig 21 ]
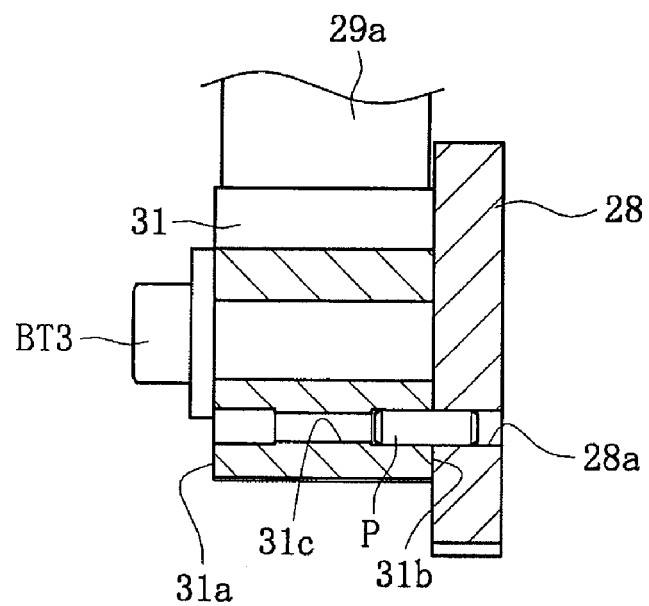

[Fig 22]
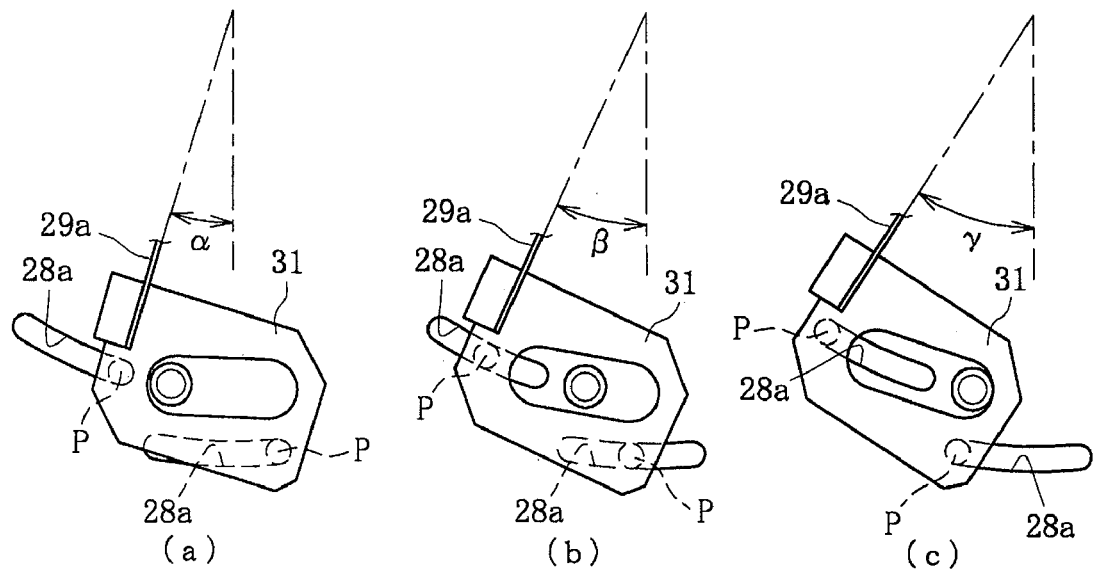
[Fig 23]
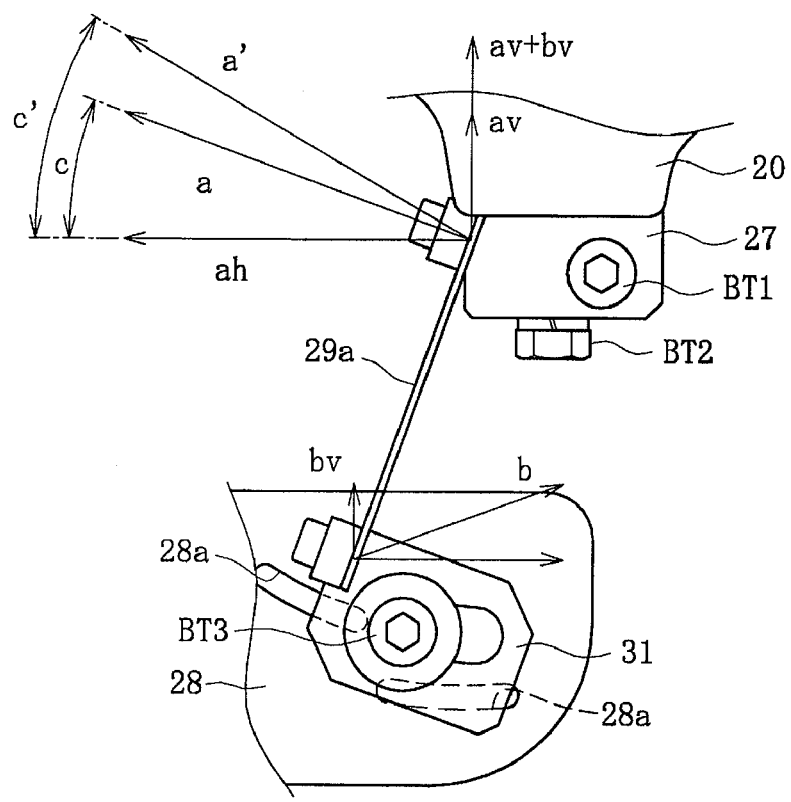

[Fig 24]
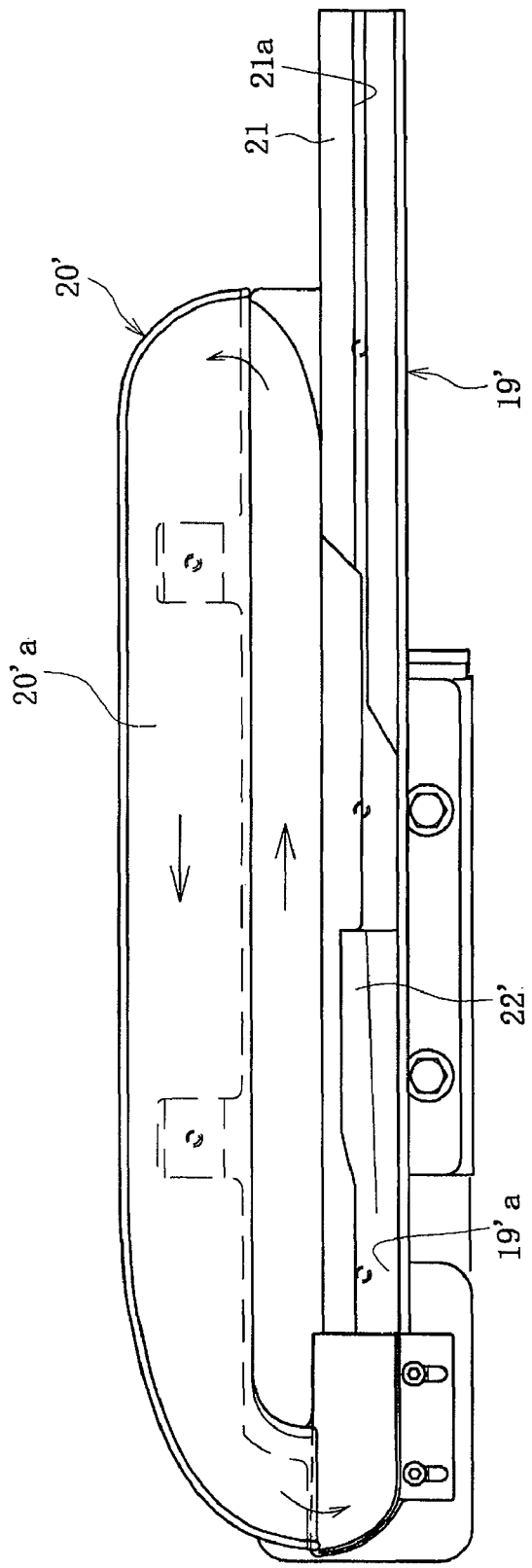

[Fig 25]
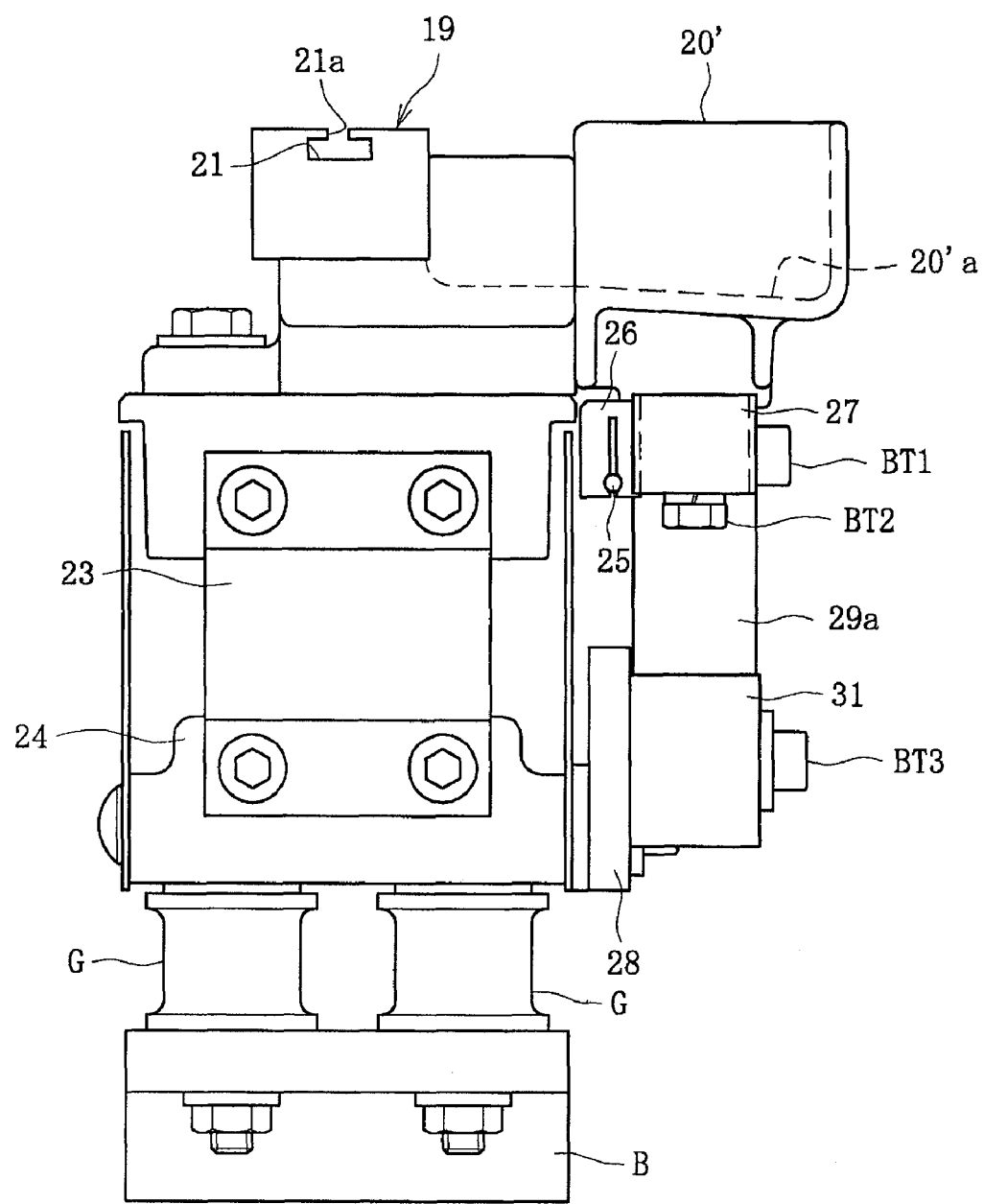

[ Fig 26 ]
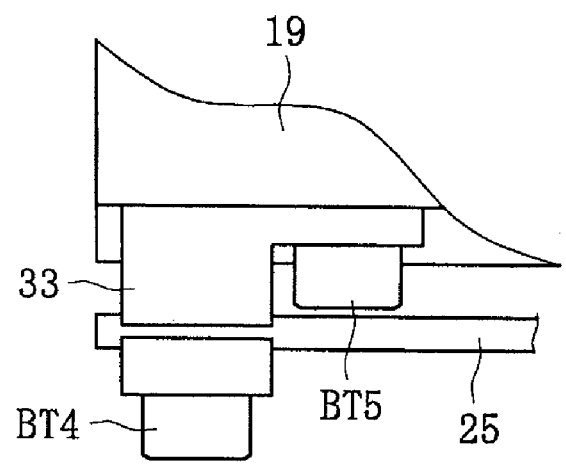
[ Fig 27 ]
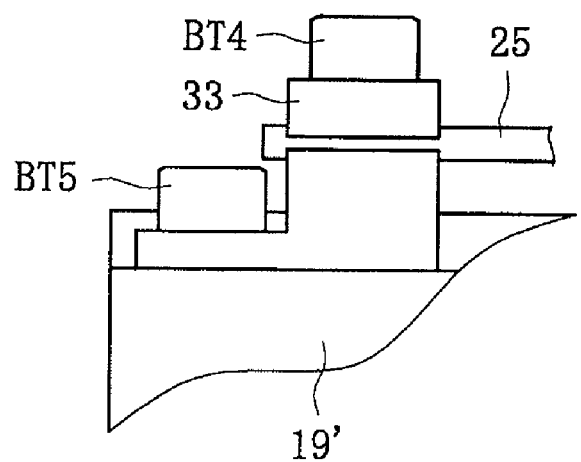

US 7,810,632 B2

VIBRATORY CONVEYING APPARATUS

CROSS-REFERENCE TO RELATED APPLICATIONS

This application is a continuation of International Patent Application No. PCT/JP2006/325776, filed on Dec. 25, 2006, which claims priority to Japanese Patent Application No. 2006-008144, filed Jan. 17, 2006 and which claims priority to Japanese Patent Application No. 2006-338338, filed Dec. 15, 2006, each of which is hereby incorporated by reference in its entirety.

BACKGROUND OF THE INVENTION

1. Field of the Invention

The present invention relates to a vibratory conveying apparatus used to align parts. The apparatus comprising a conveying chute for linearly conveying parts on a first conveying surface by reciprocating vibration from one end to the other end of the first conveying surface while aligning the posture of the parts or sorting them. The apparatus also comprising a linear return chute having a second conveying surface for returning parts dropped during the posture aligning or sorting process performed by the conveying chute to the one end of the conveying chute.

2. Description of the Related Art

In general, vibratory feeders have been used in many factories for feeding parts (e.g., workpieces) stored under the random condition to a desired machining apparatus under the aligned condition. For example, the direction and posture of parts are corrected, sorted and aligned by a vibratory bowl feeder (e.g., parts feeder) and the parts discharged therefrom are linearly conveyed to a processing machine by a vibratory linear feeder (e.g., vibratory conveying apparatus). That is the linear feeder has functions not only of maintaining the posture of parts previously aligned in the vibratory bowl feeder and feeding the parts to a next processing machine but the linear feeder also functions as a buffer for pooling a constant amount of parts therein.

In such a circumstance if the aligning operation can be performed in the linear feeder, the vibratory bowl feeder will be omitted and several advantages e.g. of eliminating a floor area for installation of the bowl feeder, and of adopting a simpler linear arrangement of parts aligning members than a case of using the hopper feeder having a circular arc configuration can be obtained. Thus, a vibratory conveying apparatus has been proposed in which the alignment and feeding of parts can be performed by a linear feeder (see Japanese Laid-Open Patent Publication No. 97912/1984).

The vibratory conveying apparatus disclosed in the Laid-Open Patent Publication comprises two troughs each having a linear conveying surface an supported by a leaf spring, and a excitation mechanism for independently driving the troughs and structured so that the posture of parts is corrected and aligned to a predetermined direction and then conveyed to a next processing machine by one trough and parts which are not corrected and aligned are dropped on the other trough and conveyed in a reverse direction to return to the one trough.

SUMMARY OF THE INVENTION

However, although the vibratory conveying apparatus of the prior art has the function of correcting and aligning the posture of parts, there are problems in that the number of structural components of the apparatus is increased. Therefore, the structure of the apparatus and control of excitation of the apparatus are complicated because independent excitation mechanisms (e.g., driving sources) are required for each trough.

Therefore, there is a desire for a vibratory conveying apparatus that has a simple structure and that can align and sort parts to a desired posture. One aspect of an embodiment of the present invention involves a vibratory conveying apparatus that comprises a conveying chute connected to a driving source. A leaf spring is reciprocatingly vibrated by the driving source and a first conveying surface is connected to the leaf spring. The first conveying surface is adapted to linearly convey parts by reciprocating vibration from a first end to a second end of the first conveying surface while aligning a posture of the parts or sorting the parts. A linear return chute has a second conveying surface that is adapted to return parts dropped from the conveying chute during the posture aligning or sorting process performed on the conveying chute. The second conveying surface is adapted to return the parts to the first end of the conveying chute. A deflectable motion transmitting structure connects the first conveying surface of the conveying chute to the return chute. The deflectable motion transmitting structure is adapted to transmit vibration applied to the first conveying surface of the conveying chute to the return chute to reciprocally vibrate the second conveying surface as well as to absorb a displacement caused by an amplitude of the reciprocal vibration.

Another aspect of an embodiment of the present invention involves a vibratory conveying apparatus comprising a base and an action-mass member that is connected to the base. The action-mass member is capable of movement relative to the base. The action-mass member comprises an electric magnet. A reaction-mass member also is connected to the base. The reaction-mass member is capable of movement relative to the base. The reaction-mass member comprises an iron core and a weight. The iron core is separated from the electric magnet by an air gap. A conveying chute comprises a first conveying surface that comprises a first end and a second end. The first conveying surface is connected to the action-mass member. A return chute is arranged generally parallel with the conveying chute. The return chute comprises a second conveying surface that comprises a first end and a second end. The first end of the second conveying surface is arranged to receive parts from the second end of the first conveying surface and the second end of the second conveying surface is arranged to deliver parts to the first end of the first conveying surface. One or more plate members support the return chute. The plate members are connected to the base. The plate members are deflectable by movement of the return chute relative to the base. A motion transmitter is connected to the return chute at a first end and to the reaction-mass member at a second end.

A further aspect of an embodiment of the present invention involves a vibratory conveying apparatus comprising a base and a lower vibrator that is connected to the base by one or more isolating members. A driving source is capable of movement relative to the base. The driving source is connected to the lower vibrator. A conveying chute comprises a first conveying surface that comprises a first end and a second end. The first conveying surface is connected to the lower vibrator by one or more leaf springs such that the driving source provides vibration energy to the first conveying surface through the vibrating member and the one or more leaf springs. A return chute is arranged generally parallel with the conveying chute. The return chute comprises a second conveying surface that comprises a first end and a second end. The first end of the second conveying surface is arranged to receive parts from the second end of the first conveying surface and the second end of the second conveying surface is arranged to deliver parts to the first end of the first conveying surface. One or more plate members support the return chute. The plate members are connected to the base. The plate members are deflectable by movement of the return chute relative to the base. A motion transmitter is connected to the return chute at a first end and to the conveying chute at a second end.

BRIEF DESCRIPTION OF THE DRAWINGS

Additional advantages and features of the present invention will become apparent from the subsequent description and the appended claims, taken in conjunction with the accompanying drawings, wherein:

FIG. 1 is a plane view showing a vibratory conveying apparatus that is arranged and configured in accordance with certain features, aspects and advantages of an embodiment of the present invention;

FIG. 2 is a front elevation view of the vibratory conveying apparatus of FIG. 1;

FIG. 3 is a side elevation view of the vibratory conveying apparatus of FIG. 1;

FIG. 4 is a cross-section view taken along a line IV-IV in FIG. 2;

FIG. 5 is a cross-section view taken along a line V-V in FIG. 2;

FIG. 6 is a schematic front elevation view of a return chute of the vibratory conveying apparatus of FIG. 1 showing a condition before a plate member has been deflected;

FIG. 7 is a schematic front elevation view of the return chute of the vibratory conveying apparatus of FIG. 1 showing a condition after the plate member has been deflected;

FIG. 8 is a schematic side elevation view of the return chute of the vibratory conveying apparatus of FIG. 1 showing a condition after the plate member has been deflected;

FIG. 9 is an enlarged schematic view showing the deflected plate member of the return chute of the vibratory conveying apparatus of FIG. 1;

FIG. 10 is a schematic front elevation view showing the conveying chute of the vibratory conveying apparatus of FIG. 1 for explaining the driving source;

FIG. 11 is a schematic view showing a reaction-mass member and leaf springs connected thereto in the driving source shown in FIG. 10;

FIG. 12 is a cross-section view taken along a line XII-XII in FIG. 10;

FIG. 13 is a cross-section view taken along a line XIII-XIII in FIG. 10;

FIG. 14 is a plan view showing another vibratory conveying apparatus that is arranged and configured in accordance with certain features, aspects and advantages of an embodiment of the present invention;

FIG. 15 is a front elevation view of the vibratory conveying apparatus of FIG. 14;

FIG. 16 is a side elevation view of the vibratory conveying apparatus of FIG. 14;

FIG. 17 is a front elevation view showing a condition in which a return chute, a plate member and a mounting member of the vibratory conveying apparatus of FIG. 14 have been removed therefrom;

FIG. 18 is a cross-section view taken along a line XVIII-XVIII in FIG. 15;

FIG. 19 is a bottom view of the mounting member in FIG. 18;

FIG. 20 is a cross-section view taken along a line XX-XX in FIG. 15;

FIG. 21 is a cross-section view taken along a line XXI-XXI in FIG. 15;

FIG. 22 is a schematic view showing an adjusting method of the mounting member relative to the plate member of the vibratory conveying apparatus of FIG. 14;

FIG. 23 is a schematic view showing a vibratory angle of the return chute for explaining a vibratory condition of the conveying chute of the vibratory conveying apparatus of FIG. 14;

FIG. 24 is a plan view showing a condition in which the return chute is mounted on the opposite side surface of the vibratory conveying apparatus of FIG. 14;

FIG. 25 is a side elevation view showing a condition in which the return chute is mounted on the opposite side surface of the vibratory conveying apparatus of FIG. 14;

FIG. 26 is an enlarged schematic view showing a condition in which a securing member of the vibratory conveying apparatus of FIG. 14 is mounted; and FIG. 27 is an enlarged schematic view showing a condition in which the securing member of the vibratory conveying apparatus of FIG. 14 is mounted on the opposite side surface.

DETAILED DESCRIPTION OF THE PREFERRED EMBODIMENT

As shown in FIGS. 1-3, a vibratory conveying apparatus comprises a conveying chute 1 for linearly conveying parts "W" on a first conveying surface from one end to the other end of the first conveying surface with aligning the posture of the parts "W" or sorting them. The parts "W" preferably are conveyed by reciprocating vibration. The vibratory conveying apparatus also comprises a return path 1b for receiving parts "W" dropped from the conveying chute 1 during the posture aligning or sorting process performed on the conveying chute. The illustrated vibratory conveying apparatus comprises a linear return chute 2 having a second conveying surface 2a for returning parts received by the return path 1b to the input end of the conveying chute 1. In FIG. 2, a reference character "B" denotes a base frame that is used to secure the vibratory conveying apparatus to a mount portion "C" of a processing machine used in combination with the apparatus.

The first conveying surface 1a of the conveying chute 1 is provided with a tooling member (hereinafter referred to as "alignment tooling member") 4 that is used to sort and align the parts "W". The first conveying surface 1a also comprises an alignment chute 3 that has a gate portion 3a used to maintain a desired posture of the parts "W". Moreover, the illustrated first conveying surface 1a comprises the return path 1b and is structured so that the alignment tooling member 4, the alignment chute 3 and the return path 1b collectively are vibrated in a reciprocating manner as a unit. The gate portion 3a maintains the posture of the parts "W" and aligns the parts in one row to feed the parts "W" from its front end to a next process.

Thus, only the parts "W" aligned in a desired posture along the first conveying surface 1a are linearly conveyed by the alignment chute 3 after having been aligned by the alignment tooling member 4. On the other hand, the parts "W" that are excluded or sorted as "not aligned in a desired posture" are dropped on the return path 1b and then conveyed from one end (left end in FIG. 1) of the conveying chute 1 to the opposite end (right end in FIG. 1) along the return path 1b. A wall surface of the opposite end of the return path 1b is bent toward the return chute 2 to guide the excluded or sorted parts "W" to the second conveying surface 2a of the return chute 2.

The conveying chute 1 is provided with a driving source for vibrating the first conveying surface 1 in a reciprocating manner. The driving source comprises, as shown in FIG. 10-FIG. 13, an action-mass member 16 on which an alternating electric magnet 14 is mounted, a reaction-mass member 12 formed by an iron core 15 and a weight 13, and leaf springs 5, 17 arranged between the action-mass member 16, the reaction-mass member 12 and a common base 11. More particularly, the action-mass member 16 is connected to the common base 11 via the inner pair of leaf springs 17 and the reaction-mass member 12 is connected to the common base 11 via the outer pair of leaf springs 5.

Furthermore, in addition to considerations of suppressing unevenness of the thickness of the leaf springs 5, 17, the span therebetween and conditions of quenching, because the upper and lower ends of each of the leaf springs 5, 17 are formed with shoulder portions that provide a reference of assembly to unify the mounted position (height) and thus to reduce error in assembly, it is possible to more exactly assemble the leaf springs 5, 17 in situ without using special tools. Also, because the leaf springs 5, 17 are arranged orthogonally to the common base 11 and their predetermined mounting angle is set during assembly, it is possible to more easily maintain a desired positional relationship between the leaf springs 5, 17 highly accurate.

The alternating electric magnet 14 and the iron core 15 are separated a small gap each other and form an excitation member that applies vibratory energy to the conveying chute 1 when the alternating electric magnet 14 is actuated to generate resonance. With the resonance caused by the electric magnet 14 and the iron core 15, the action-mass member 16 and the reaction-mass member 12 reciprocate in opposite directions relative to each other due to the interposed leaf springs 5, 17. The first conveying surface 1a is connected to the action-mass member 16 and, therefore, reciprocates with the action-mass member 16. Due to this reciprocating vibration, the parts "W" on the first conveying surface 1a are conveyed from one end of the first conveying surface 1a to the other end of the first conveying surface 1a. The excitation means may be formed, for example, by a piezo-electric resonator or the like.

On the other hand, the reciprocating vibration of the reaction-mass member 12, which provides a counterbalancing weight 13 that moves in an opposite direction to the action-mass member 16, can cancel the reaction caused by the vibration of the action-mass member 16. As shown in FIG. 12, the weight 13 is formed by a plurality of laminated mass members bolted to the reaction-mass member 12 and the number of the mass members can be adjusted to have a weight sufficient to cancel the movement of the reaction-mass member 12.

Because the vibratory feeder is a balanced type by which the reaction of vibration can be cancelled, it is possible to suppress vibration leakage and noise generation. Thus, it is possible to provide a stable conveyance of the parts "W" without unnecessarily uneven conveyance. In addition, because the vibration leakage can be suppressed relative to the first conveying surface, it is possible to improve the feeding accuracy of the parts "W" without especially increasing the rigidity of the base frame "B" and the mounting portion "C".

The return chute 2 is arranged substantially in parallel with the conveying chute 1 and comprises the second conveying surface 2a for receiving parts "W" dropped during the aligning and sorting processes on the conveying chute 1. The return chute 2 preferably is linearly formed to return the received parts "W" to the starting end (i.e., the left end in FIG. 1) of the conveying chute. More particularly, the return chute 2, as shown in FIG. 3, is supported on a supporting member 10 that is secured on the base frame "B" via a pair of plate members 6 (see FIG. 2). The return chute 2 preferably is reciprocated in a vibratory manner by a motion transmitting construction described later. Vibration of the return chute 2 conveys the parts "W" on the second conveying surface 2a in a direction opposite to the conveying direction of the conveying chute 1. That is, the return chute 2 is not provided a dedicated driving source. Instead, the return chute 2 is adapted to be driven by reciprocating vibration energy transmitted from the motion transmitting construction described later.

A member forming the second conveying surface 2a of the return chute 2 (i.e., a member supported by the plate members 6 and reciprocated thereby) preferably is formed of a light-weight plastic material. Such a material choice enables a more efficient transmission of the reciprocating vibration by the motion transmitting construction. Although the member forming the second conveying surface 2a may be made of any other light weight material (e.g. expandable material or light weight alloy), plastic material is preferable because it has excellent formability and thus is well suited for mass production, which reduces the manufacturing costs associated with the apparatus.

As described above the motion transmitting construction transmits the reciprocating vibration applied to the first conveying surface 1a to the second conveying surface 2a such that the second conveying surface 2a also can be reciprocated. As shown in FIG. 2, in one configuration, the motion transmitting construction comprises a bar-like member 9 (e.g., a wire member having a generally circular cross-section) having a generally uniform circular cross-section. The bar-like member 9 can be made of a relatively flexible material, for example, such as stainless steel or the like. One end of the bar-like member 9 can be secured on a securing structure 8 (see FIG. 4) that projects from the reaction-mass member 12 of the conveying chute 1 and another end of the bar-like member 9 can be secured on a securing structure 7 that projects from the return chute 2. Thus, the bar-like member 9 connects the conveying chute 1 and the return chute 2.

The securing members 8, 7 are formed with notches 8a, 7a respectively and securing bolts b1, b2 extend across the notches 8a, 7a. Thus the conveying chute 1 and the return chute 2 can be connected via the bar-like member 9 by first loosening the securing bolts b1, b2, then inserting both ends of the bar-like member 9 into the notches 8a, 7a and finally fastening the securing bolts b1, b2.

Accordingly, because the reciprocal vibration applied to the first conveying surface 1a of the conveying chute 1 can be transmitted to the return chute 2 via the transmitter, it is possible to eliminate a dedicated driving source for reciprocating the return chute 2. Thus, the structure of the vibratory conveying apparatus can be simplified. In some configurations, a plate-like member may be used in place of the bar-like member 9.

One pair of plate members 6 that support the second conveying surface 2a of the return chute 2 can be adjusted to a desired angle and thus adjusted to any vibratory angle. For example, as shown in FIG. 6, the pair of plate members 6 extending orthogonally to a floor can be deflected to a desired angle as shown in FIGS. 7-9 when the member forming the second conveying surface 2a of the return chute 2 is moved to the rightward direction (i.e., the direction of an arrow in FIG. 6).

Since good driving operation of the return chute 2 is less likely to be obtained when the plate members 6 of the supporting mechanism are overly rigid and resistant to bending (i.e., when compared to ordinal leaf springs), it is preferable that the plate members 6 are supported by a sliding connection such as a fulcrum of a quadric link mechanism. In some configurations, the plate members 6 can be made of thin mild steel plates instead of quenched spring steel plates having very low bending rigidity.

According to the structure of the illustrated vibratory conveying apparatus, because the plate members 6 can be adjusted to any desired vibratory angle by deflecting them to a desired angle, it is possible to easily adjust the reciprocating vibration applied to the second conveying surface 2*a* of the return chute 2 independent of the conveying chute 1. That is, the conveyance by the return chute 2 can be performed under different conditions from the conveying chute 1 and thus the operation conditions of the conveying chute 1 and the return chute 2 can be easily and independently adjusted although using only a single driving source. Accordingly, it is possible to improve not only the posture aligning function of the conveying chute 1 but the returning function of the return chute 2 as well as to continuously adjust the vibratory angle by deflecting the plate members 6 to a desired angle.

In addition, because the bar-like member 9, which defines at least a portion of a motion transmitter, is structured so that it is secured to the securing members 8, 7 by fastening the securing bolts b1, b2 respectively, the securing position of the bar-like member 9 in its extending direction can be varied. This enables securing the bar-like member 9 corresponding to the variation of the relative position between the securing members 8, 7 of the return chute 2 although the variation is varied when the return chute 2 is moved to deflect the plate members 6. Accordingly it is possible to easily adjust the vibratory angle continuously (i.e. a non-stepped manner) by deflecting the plate members 6 to a desired angle.

In addition, since the bar-like member 9 as the motion transmitter is structured so that it is secured to the securing members 8, 7 by fastening the securing bolts b1, b2 respectively, a bar-like member 9 of slightly different diameter may be easily secured and thus the versatility of the bar-like member 9 also can be improved. Furthermore, since the present apparatus can be easily applied to the bar-like member 9 of different diameter, the bar-like member 9 can be varied to correspond to changes in the weight of the return chute 2.

Also, bolts b3 for securing the supporting member 10 are passed through elongated apertures 10*a* formed in the supporting member 10. This permits movement of the supporting member 10 relative to the bolts b3 after the return chute 2 has been moved to deflect the plate members 6. Although it has been described that the plate members 6 are deflected to a desired angle by moving the member forming the second conveying surface 2*a* of the return chute 2, the plate member 6 also may be deflected by moving the supporting member 10.

In operation, parts "W" to be fed to a next processing step are supplied to one end (i.e., the left end of FIG. 1) without regard to their orientation or posture (i.e., in a random condition) and the alternating electric magnet 14 is energized. Thus, resonance is caused between the magnet 14 and the iron core 15 and reciprocating vibration is transmitted to the first conveying surface 1*a* via the action-mass member 16 to convey the parts "W" by the reciprocating vibration.

The parts "W" are aligned by the alignment tooling member 4 during conveyance and only parts "W" having an intended posture are fed to a next processing step through the gate portion 3*a*. On the other hand, the parts "W" excluded or sorted as "not aligned in intended posture" by the alignment tooling member 4 are dropped on the return path 1*b* and conveyed in the same direction until they reach the conveying surface 2*a* of the return chute 2 at the opposite end of the conveying chute 1.

The iron core 15 that resonates with the energizing of the alternating electric magnet 14 reciprocally vibrates together with the reaction-mass member 12 in a direction opposite to that of the action-mass member 16. This reciprocal vibration is transmitted to the bar-like member 9 via the securing member 8 mounted on the reaction-mass member 12 and to the return chute 2 via the securing member 7. Since vertical components of the reciprocal vibrations applied to the conveying chute 1 and the return chute 2 are opposite each other, the bar-like member 9 is deflected by a small amount (i.e., deflects into an "S" shaped configuration) to absorb a displacement caused by the amplitudes of the reaction-mass member 12 and the action-mass member 16. The parts "W" on the second conveying surface 2*a* of the return chute 2 are conveyed by the reciprocating vibration in a direction opposite to that of the conveying chute 1.

As the second conveying surface 2*a* has an up-grade, the parts "W" guided by the return path 1*b* are conveyed along the up-grade and returned to the one end of the conveying chute 1. Accordingly, the reciprocal vibration applied to the return chute 2 preferably has a vibratory angle at which the parts "W" can ascend the up-grade and, thus, the plate member 6 has been previously deflected to a desired angle. This enables adjustment of the vibratory angle of the return chute 2 independently of that of the conveying chute 1, irrespective of using only a single driving source.

As described above, because the return chute 2 is arranged substantially in parallel with the linear conveying chute 1 and the alignment and sorting of the posture of the parts "W" can be performed on the conveying chute 1, it is possible to eliminate the vibratory bowl feeder and, thus, to reduce the floor space consumed by the apparatus. In addition, since the conveying chute 1 has a linear configuration, the formation of the alignment tooling member 4 can be performed easier than that of the vibratory bowl feeder having a circular arc configuration and the parts "W" can be more easily and more accurately aligned with the intended posture.

Because one end of the bar-like member (or plate-like member) is secured on the reaction-mass member 12 and connected to the return chute 2, reaction of the vibration can be effectively used and, thus, the transmission of vibration via the motion transmitter can be efficiently performed. In some embodiments, the one end of the bar-like member 9 may be secured to other portion (e.g. a portion of the member forming the first conveying surface 1*a* or action-mass member 16).

In addition, because the bar-like member 9 is formed of relatively flexible material, such as stainless steel, and thus can be easily deflected to an "S" shaped configuration and then return to its original straight configuration, the reciprocating vibration can be more exactly transmitted. This is also true in a case of using the plate-like member as a motion transmitter in place of the bar-like member. The bar-like member 9 (including a plate-like member) may be any material such as steel if it is not liable to be plastically deformed and its cross section may be any configuration other than a circle but it preferably has a generally uniform cross section.

Certain features, aspects and advantages of the embodiment shown in FIG. 1 can be applied to a vibratory conveying apparatus that does not include a mechanism for canceling the reaction force against the reciprocal vibration generated by the driving source (e.g., the excitation means formed by alternating electric magnet 14 and the iron core 15 etc.) such as an ordinary linear feeder and not a balanced type feeder such as that introduced above. In addition, the securing member for the motion transmitter is not limited to the illustrated and described example and any suitable form of securing may be used if it can transmit the reciprocal vibration of the conveying chute to the return chute by connecting the conveying chute and the return chute.

With reference now to FIGS. 14-17, another vibratory conveying apparatus that is arranged and configured in accordance with certain features, aspects and advantages of a second embodiment of the present invention involves a so-called semi-floating type linear feeder. The illustrated configuration comprises, as shown in FIGS. 14-17, a conveying chute 19 for aligning or sorting the posture of parts "W" on a first conveying surface 19a and linearly conveying them from one end to the other end of the first conveying surface 19a by reciprocating vibration. The illustrated configuration also comprises a return path 19b for receiving parts "W" dropped from the conveying chute 19 during the posture aligning or sorting process performed on the conveying chute as well as a linear return chute 20 having a second conveying surface 20a for returning parts "W" received by the return path 19b to the one end of the conveying chute 19. In FIG. 15, a reference character "B" denotes a base frame for securing the vibratory conveying apparatus to a mating machine and a reference character "G" denotes a vibration isolating rubber.

The first conveying surface 19a of the conveying chute 19 is provided with an alignment tooling member 22 for sorting and aligning the parts "W", an alignment chute 21 having a gate portion 21a for maintaining the posture of the parts "W", and the return path 19b and is structured so that the alignment tooling member 22, the alignment chute 21 and the return path 19b are reciprocatingly vibrated as a unit. The gate portion 21a is used to maintain the posture of parts "W" and to align the parts "W" in one row to feed the parts "W" to a next process. The functions and actions of the conveying chute 19 are same as those of the conveying chute 1 of the first embodiment.

The conveying chute 19 is provided with a driving source (not shown) that reciprocatingly vibrates its first conveying surface 19a and a lower vibrator 24 (see FIG. 16) that reciprocatingly vibrates at a phase opposite to that of the conveying chute 19 with a reaction force of the conveying chute 19 caused by the reciprocal vibration of the driving source. Thus when the driving source is energized, the conveying chute 19 is reciprocated via leaf springs 23 and the parts "W" on the first conveying surface 19a are successively conveyed. With this reaction force, the lower vibrator 24 is reciprocated by elasticity of the vibration isolating rubber "G" at an opposite phase. Thus, the reciprocal vibration is balanced and the likelihood of transmission of the vibration to the base frame "B" is greatly reduced or eliminated. Such a linear feeder may be called a "semi-floating type".

The return chute 20 is arranged substantially in parallel with the conveying chute 19 and has a second conveying surface 20a for receiving the parts "W" dropped from the conveying chute 19 during the aligning or sorting process performed thereon and arranged linearly to return the received parts "W" to one end (i.e., the left end in FIG. 14) of the conveying chute 19. Similar to the first embodiment, such a return chute 20 is supported by a plate-like supporting member 28 via a pair of fore and aft plate members 29a, 29b and is structured so that it is reciprocated by a motion transmitter later mentioned to convey the parts "W" on the second conveying surface 20a in a direction opposite to that of the conveying chute 19. Also similar to the first embodiment, the return chute 20 is not provided with any driving source and is driven only by the reciprocal vibration transmitted from the motion transmitting structure.

As described above, the motion transmitting structure is intended to reciprocally vibrate the second conveying surface 20a by transmitting the reciprocal vibration applied to the first conveying surface 19a to the return chute 20. In the embodiment shown in FIG. 14, the motion transmitting structure comprises, similar to the first embodiment, a bar-like member 25 preferably having a generally uniform circular cross-section (see FIGS. 15 and 16). Such a bar-like member 25 can be made of relatively flexible material, such as stainless steel and its one end can be fitted into a notch of the securing block 33 of the conveying chute 19 and the other end can be fitted into a notch of the securing block 26 of the return chute 20 to connect the conveying chute 19 and the return chute 20.

The securing block 26 can mounted on the return chute 20 via mounting members 27, which connect the securing block 26 by bolts BT1, as shown in FIGS. 18 and 19 and on the other hand can be connected to the return chute 20 by bolts BT2. A pair of fore and aft plate members 29a, 29b supporting the return chute 20 can be secured at their top ends to the mounting members 27, 30.

Accordingly, since the reciprocal vibration applied to the first conveying surface 19a of the conveying chute 19 can be transmitted to the return chute 20 by the motion transmitting structure (including the bar-like member 25), it is possible to eliminate the driving force for reciprocating the return chute 20 and to simplify the structure of the vibratory conveying apparatus. Such a motion transmitting structure (e.g., bar-like member 25) can be the same as or similar to the bar-like member 9 of the first embodiment.

The plate members 29a, 29b are respectively connected at their top ends to the return chute 20 via the mounting members 27, 30 and at their bottom ends to the mounting member 31, 32 mounted on the supporting members 28. Similar to the plate members 6 of the first embodiment, it is preferable that the plate members 29a, 29b are supported by a sliding connection such as a fulcrum of the quadric link mechanism. Preferably, the plate members 29a, 29b are made of thin mild steel plates instead of quenched spring steel plates having very low bending rigidity.

Mounting members 31, 32 (e.g., block members that secure the bottom ends of the plate members 29a, 29b) of the second embodiment can pivot independently of each other relative to the supporting member 28. This enables one to adjust the fore and aft plate members 29a, 29b to any vibratory angle independent of each other.

More particularly, the supporting member 28 can be formed with elongated circular arc apertures 28a, 28b through which pins "P" that project from the mounting members 31, 32 are inserted so that the pins "P" can slide in the elongated apertures 28a, 28b together with the mounting members 31, 32. On the other hand, as shown in FIG. 21, the mounting member 31 (and 32) is formed with a through aperture 31c orthogonally to its mounting surface and the pin "P" can be press fit into the through aperture 31c.

As described above, the mounting member 31 has the pin "P" projecting from its mounting surface and is able to move along the elongated aperture 28a together with the pin "P" and the movement of the mounting member 31 is limited to a range defined by the pins and the elongated aperture 28 while being secured to the supporting member 28 by the fastening bolts BT3. Accordingly, it is possible, as shown in FIG. 22, to set the plate member 29a (and 29b) at an angle α (FIG. 22(a)), at an angle β (FIG. 22(b)), and at an angle γ (FIG. 22(c)) so that the fore and aft plate members 29a, 29b can have any vibratory angle independent of each other.

As shown in FIGS. 22(a)-(c), the mounting members 31, 32 can pivot around a center that is a top secured portion of the plate members 29a, 29b to change the inclined angle of the plate members 29a, 29b. Thus, it is possible to reduce or eliminate the likelihood of the return chute 20 being moved vertically during adjustment of the vibratory angle relative to the return chute 20.

According to the embodiment of FIGS. 14-17, because the fore and aft plate members 29a, 29b are adjustable to any vibratory angle independent of each other, it is possible to appropriately adjust fore and aft the reciprocal vibration applied to the second conveying surface 20a of the return chute 20 in accordance with the conditions (e.g. grade angle) and the configuration of the parts "W", etc. Especially when applied to the semi-floating type linear feeder, if the fore and aft plate members 29a, 29b are adjustable to any vibratory angle independent of each other, it is possible to easily correct somewhat unstable reciprocal motion of the conveying chute (including fluctuation elements) and thus to achieve better conveyance of the parts "W" by the second conveying surface 20a.

That is, as previously described, the lower vibrator 24 is not secured on a floor and maintains balance by being vibrated at a phase opposite to that of the conveying chute 19 by the reaction force of the conveying chute 19. Accordingly as shown in FIG. 23, by defining a vector (magnitude and direction) of a half amplitude of vibration of the ascending side of the return chute 20 as "a" (i.e., a direction orthogonally to the plate member 29a (29b)), and a vector of the lower vibrator 24 (i.e., the supporting member 28 side) as "b", a vertical component "bv" of the vector is generated when the vector "b" is not horizontal. Since the vector "b" is a vibration at a phase opposite to that of the conveying chute 19, the horizontal component of the vector "b" has a direction opposite to that of a vector "ah".

However, if the vertical component "bv" of the vector "b" is generated, it is added to a vertical component "av" of the vector "a" and, thus, the vertical component would become (av+bv) and the vector "b" would become a vector "a'" and further an angle "c" from the horizontal surface would become an angle "c'". That is, the generated vector "bv" is transmitted to the return chute 20 via the plate member 29a (29b) and gives influence to the vibration of the return chute 20. Thus according to the semi-floating type linear feeder, because the direction and magnitude of the vibration of the vibrator 24 are varied, many fluctuation elements are included in reciprocal vibration of the conveying chute 19 which is different from the vibratory conveying apparatus of the first embodiment. In addition, because the direction of the vector "bv" is influenced and determined by the mass and the position of center of gravity of the conveying chute 19, the number of fluctuation elements would be further increased.

Because the fore and aft plate members 29a, 29b can be adjusted to any vibratory angle independent of each other when used with the semi-floating type linear feeder, which results in many fluctuation elements in the conveying chute 19, it is possible to easily correct the reciprocal motion transmitted to a whole length of the return chute 20 as well as to improve the conveyance of the parts "W" by the second conveying surface 20a.

Further, a pair of surfaces of the mounting member crossing orthogonally to the mounting direction for securing the ends of the plate members 29a, 29b have a symmetrical configuration each other. For example, as shown in FIGS. 20 and 21, the mounting members 31 (32) securing the bottom ends of the plate members 29a, 29b have a pair of surfaces 31a, 31b crossing orthogonally to the mounting direction (left-right direction in FIGS. 20 and 21) and having a symmetrical configuration each other (left-right symmetry). Similarly as shown in FIGS. 18 and 19, the mounting member 27 securing the top end of the plate members 29a has a pair of surfaces 27a, 27b crossing orthogonally to the mounting direction (left-right direction in FIG. 18) and having a symmetrical configuration each other (left-right symmetry).

From the structure described above, it is possible to easily mount the return chute to the conveying chute 19 from either side of the conveying chute and to commonly use the plate members 29a, 29b, their mounting members 31, 32 etc. and thus to simplify the inventory management. That is, as shown in FIG. 24, in a case of mounting the return chute 20' (i.e. dedicated return chute to be mounted on the opposite surface and having a second conveying surface 20a') to the opposite surface of the conveying chute 19' after the return chute 20, its mounting members 31, 32, 27 and the securing member 33 have been removed, it is possible to mount the once removed mounting members 31, 32, 27 to the opposite surface of them (see FIG. 25). More particularly since the pins "P" mounted on the mounting members 31, 32 are press fit in the through aperture 31c, it is possible to easily re-press fit into the opposite surface. In FIG. 24 numerals 19a', 22' respectively denote a first conveying surface formed on the conveying chute 19' and an alignment tooling member.

The securing structure 33 has a pair of asymmetric surfaces crossing orthogonally to its mounting direction as shown in FIG. 26, which can be mounted on the opposite surface of the conveying chute 19' as shown in FIG. 27 and can be commonly used similarly to the mounting members 31, 32, 27. In addition, the securing structure 33 is secured on the conveying chute side by bolts BT5 and is adapted to secure the bar-like member 25 by fastening the bolts BT4. For remounting the securing structure 33 to the opposite surface of the conveying chute 19', the bolts BT4, BT5 are removed and the securing structure 33 applied to the opposite surface can be secured by using the removed bolts BT4, BT5. When the securing member 33 is mounted on the opposite surface as shown in FIG. 27, the effective length of the bar-like member 25 is reduced. However since the reduction of the effective length does not overly impair performance of the apparatus, there is no problem in practical use.

Certain features, aspects and advantages of the present invention have been described with reference to certain preferred embodiments. Obviously, modifications and alternations will occur to those of ordinary skill in the art upon reading and understanding the preceding detailed description. For example, the second embodiment can be applied to a vibratory conveying apparatus (so-called balanced type linear feeder) provided with means for canceling reaction against the reciprocal vibration of the driving source of the first embodiment. In addition, the structure for adjusting the vibratory angle of the fore and aft plate members 29a, 29b to any desirable vibratory angle is not limited to that described above and it is possible to adopt a structure in which whole the mounting member is buried in a circular arc groove movably therealong to adjust the mounting angle of the plate member 29a, 29b. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vibratory conveying apparatus comprising:
   a conveying chute connected to a driving source, a leaf spring reciprocatingly vibrated by said driving source and a first conveying surface connected to said leaf spring, said first conveying surface being adapted to linearly convey parts by reciprocating vibration from a first end to a second end of said first conveying surface while aligning a posture of the parts or sorting the parts;

a linear return chute having a second conveying surface, said second conveying surface being adapted to return parts dropped from said conveying chute during the posture aligning or sorting process performed on said conveying chute, said second conveying surface being adapted to return said parts to said first end of said conveying chute;

a deflectable motion transmitting structure connecting said first conveying surface of said conveying chute to said return chute, said deflectable motion transmitting structure being adapted to transmit vibration applied to said first conveying surface of said conveying chute to said return chute to reciprocally vibrate said second conveying surface as well as to absorb a displacement caused by an amplitude of the reciprocal vibration;

said driving source comprising a piezo-electric element or an alternating electric magnet wherein the driving source itself vibrates reciprocally to produce reciprocating vibration.

2. A vibratory conveying apparatus of claim 1, wherein said deflectable motion transmitting structure comprises a bar-like member or a plate-like member.

3. A vibratory conveying apparatus of claim 2, wherein said second conveying surface of said return chute is supported by plate members arranged fore and aft along said second conveying surface, and wherein each plate member is adjustable among a range of angles.

4. A vibratory conveying apparatus of claim 3, wherein said fore and aft plate members can be adjusted independently of each other.

5. A vibratory conveying apparatus of claim 3 further comprising mounting members that secure ends of the plate members, and each of the mounting members comprising a pair of surfaces that cross orthogonally to a mounting direction, wherein each of said pair of surface comprises a symmetrical configuration.

6. A vibratory conveying apparatus of claim 2, wherein securing positions of said deflectable motion transmitting structure is variable.

7. A vibratory conveying apparatus of claim 1, wherein a member forming said second conveying surface of said return chute is formed of a lightweight plastic material.

8. A vibratory conveying apparatus of claim 1, wherein the driving source comprises an action-mass member connected to the first conveying surface, a reaction-mass member provided with a predetermined weight, a common base, an excitation means coupled to apply vibration to the action-mass member and the reaction-mass member, and the action-mass member transmitting vibration to the first conveying surface and the reaction-mass member cancelling a reaction caused by the vibration.

9. A vibratory conveying apparatus of claim 8, wherein one end of the motion transmitting structure comprises a bar-like member or a plate-like member that is secured to the reaction-mass member and that is connected to the return chute.

10. A vibratory conveying apparatus of claim 1, wherein said driving source comprises an alternating electric magnet.

11. A vibratory conveying apparatus of claim 1, wherein said driving source comprises a piezo-electric resonator.

* * * * *